US006628266B1

(12) United States Patent
Aguilar et al.

(10) Patent No.: US 6,628,266 B1
(45) Date of Patent: Sep. 30, 2003

(54) JOYSTICK CONTROLLER

(75) Inventors: Andrew Aguilar, Hertfordshire (GB); Philip Barrowclough, Hampshire (GB)

(73) Assignee: Nokia Mobile Phones Limited, Espoo (FI)

( * ) Notice: Subject to any disclaimer, the term of this patent is extended or adjusted under 35 U.S.C. 154(b) by 56 days.

(21) Appl. No.: 09/604,733

(22) Filed: Jun. 28, 2000

(30) Foreign Application Priority Data

Jun. 30, 1999 (GB) .............................. 9915330

(51) Int. Cl.[7] .............................. G09G 5/08; G05G 9/47
(52) U.S. Cl. .................... 345/161; 200/6 R; 463/38; 348/734; 74/471 XT
(58) Field of Search .................. 345/156–169; 348/734; 341/34, 20; 74/471 XY; 200/6 A, 6 R, 5 A, 5 R; 273/148 B; 463/37, 38

(56) References Cited

U.S. PATENT DOCUMENTS

| | | | | |
|---|---|---|---|---|
| 4,313,113 A | * | 1/1982 | Thornburg | 340/709 |
| 4,395,134 A | | 7/1983 | Luce | |
| 4,825,019 A | * | 4/1989 | Fisher | 200/6 A |
| 4,945,357 A | * | 7/1990 | Tal | 341/20 |
| 5,307,297 A | * | 4/1994 | Iguchi et al. | 345/169 |
| 5,473,126 A | | 12/1995 | Wu | 200/64 |
| 5,488,206 A | * | 1/1996 | Wu | 200/6 A |
| 5,510,812 A | | 4/1996 | O'Mara et al. | |
| 5,659,334 A | * | 8/1997 | Yaniger et al. | 345/156 |
| 5,737,028 A | * | 4/1998 | Bertram et al. | 348/563 |
| 5,831,593 A | * | 11/1998 | Rutledge | 345/156 |
| 6,115,030 A | * | 9/2000 | Berstis et al. | 345/161 |
| 6,135,886 A | * | 10/2000 | Armstrong | 463/37 |

FOREIGN PATENT DOCUMENTS

| | | | |
|---|---|---|---|
| EP | 0616298 A1 | 9/1994 | |
| GB | 2351561 | * 3/2001 | G09G/9/47 |
| WO | 9508167 | 3/1995 | |

* cited by examiner

Primary Examiner—Lun-Yi Lao
(74) Attorney, Agent, or Firm—Antonelli, Terry, Stout & Kraus, LLP

(57) ABSTRACT

A joystick controller for a portable radio communication device in which a ring of elasto-resistive material which when relaxed acts as an insulator, and when stressed acts as a conductor is positioned below the joystick lever of the controller and above four pairs of contact pads arranged in a circle, and the elasto-resistive material is used to transduce the movement of the joystick lever so as to provide an electrical signal output indicative of the amount of movement of the joystick lever.

6 Claims, 3 Drawing Sheets

JOYSTICK CONTROLLER

BACKGROUND OF THE INVENTION

The present invention relates to a joystick controller, in particular to a joystick controller for a portable radio communication device.

A joystick controller may typically be characterised as a hand held device which can control the position and the movement of some object or thing that is remote from the joystick. Joysticks are widely used in electronic/electrical environments, for example, in computer games to control the movement of an on-screen image, in robotics to control the positioning of a robot arm, and recently in laptop computers as selection devices. Common to all joystick applications is that the user relies on his hand-eye co-ordination to effect and control the position and movement of the remote object.

With so many different joystick applications presently in use, there are available a correspondingly great many different designs of joystick controllers. In the main, a conventional joystick controller comprises a joystick lever or handle upstanding from a housing base, the lever being constrained so as to rock from side to side, up and down and in intermediate positions thereof in relation to the housing base. The joystick lever is effectively mounted on a ball joint with respect to the housing base, and can thereby pivot around any rotational axes in the base plane. In analogue joysticks the pivoting movement of the joystick lever is detected by a series of strain gauges provided in the housing base, which output electrical signals correlating to the sensed movement. These output electrical signals are used to control the remote object. Digital joysticks make use of on/off contacts and are therefore generally smaller in size than analogue joysticks. Spring bushings and such like are arranged in the housing and connected to the lever to return the lever back to its balanced upright position when it is released by the user.

In the field of mobile communications, and in particular mobile telephones, it is envisaged that joystick controllers could be used to provide a quick and convenient means for the user to interact with a mobile telephone, for example to navigate through the variety of menu options, or for use in browser applications. However, because of their relatively bulky and intricate design, known analogue joysticks do not readily lend themselves to mobile telephone applications. It is therefore an aim of the present invention to provide an improved joystick controller, particularly one that is apt for use in a radiotelephone.

SUMMARY OF THE INVENTION

Accordingly the present invention resides in a joystick controller for a portable radio communication device wherein the controller or the device provides a housing, and wherein the controller comprises a control member adapted for actuation by a user and mounted in relation to the housing for pivotal movement therebetween, electrical contact points provided on a printed circuit board and supported in the housing spaced from the control member and outputting an electrical signal when conductively bridged, and elasto-resistive material which in a relaxed state is an electrical insulator, and in a stressed state is an electrical conductor, disposed between, and in contact with, the control member and the electrical points; the arrangement being such that when there is no force applied by the user on the control member it is in an equilibrium position and accordingly does not apply stress on the elasto-resistive material and accordingly the electrical contact pads are on open circuit, and when a force is applied by the user to the control member it is in a non-equilibrium position and accordingly applies a stress on the elasto-resistive material and accordingly the electrical pads are on closed circuit, wherein in the non-equilibrium position the elasto-resistive material conducts current proportionally in response to the degree of stress applied on the elasto-resistive material by the control member, whereby the amount of current conducted is indicative of the position of the control member in relation to the elasto-resistive material.

A joystick controller of the present invention presents a number of advantages over prior art joysticks, in particular prior art analogue joysticks. It is found that the use of elasto-resistive material as a transducer between movement of the control member and the output of electrical signals affords a more compact and lighter joystick controller design. Such a design obviates the need for strain gauge sensing devices, and thus their associated complexity and expense. Accordingly, there are far fewer constraints on the actual form or shape the joystick controller can take, and as a result increases the freedom for design. Thus, the present invention provides for a simplified solid state, low cost joystick controller which can be used for rapid operation e.g. as a pointing device for an on-screen cursor of a mobile phone, or a scrolling function on a menu based user interface of a mobile phone.

An advantage of using the ER material is that because the electrical current induced across the contact pads is proportional to the mechanical load applied to the lever, an analogue signal is produced, which is suitable for cursor control in browser type applications. This is because the electrical resistance of the ER material is dependent on the degree to which it is subjected to distortion forces.

In a preferred embodiment, the force applied to move the control member is 2 Newtons. As the applied force increases so the resistance of the ER material decreases Advantageously, the ER material comprises resilient bias means. The resilient bias means is adapted to act on the joystick control lever in such a manner so as to retain the control lever in a first position in which its orientation is substantially orthogonal to the plane of the ER material, and in which the forces exerted by the resilient means are in an equilibrium condition. When the control lever is moved by the user it attains a second position displaced from the first position in which the forces exerted by the resilient bias means are in a non equilibrium condition and act to apply a urging force to return the control lever to its first position. Accordingly, a joystick controller of the: present invention is not encumbered by spring bushings or other such bias arrangements ordinarily necessary to return the control lever to its equilibrium position.

The elasto-resistive material may be a polymer composition comprising electrically conducting particles encapsulated within an electrically insulating elastomer, the ratio of the conducting particles to the non-conducting elastomer being such that the electrical resistivity of the material varies in a linear manner in response to the application of force to the material.

The conductive filler may be a metal powder such as Ni INCO 287. The elastomer may be a silicone elastomer based on polydimethylsiloxane and having a low surface energy, and being high on the triboelectric series. The modifier may be fumed silica.

Conveniently, the ratio of conductive filler to elastomer is in the range 1:1 to 3:1.

BRIEF DESCRIPTION OF THE DRAWINGS

The present invention will now be described by way of example with reference to the accompanying drawings in which.

DETAILED DESCRIPTION OF THE INVENTION

Figure 1:
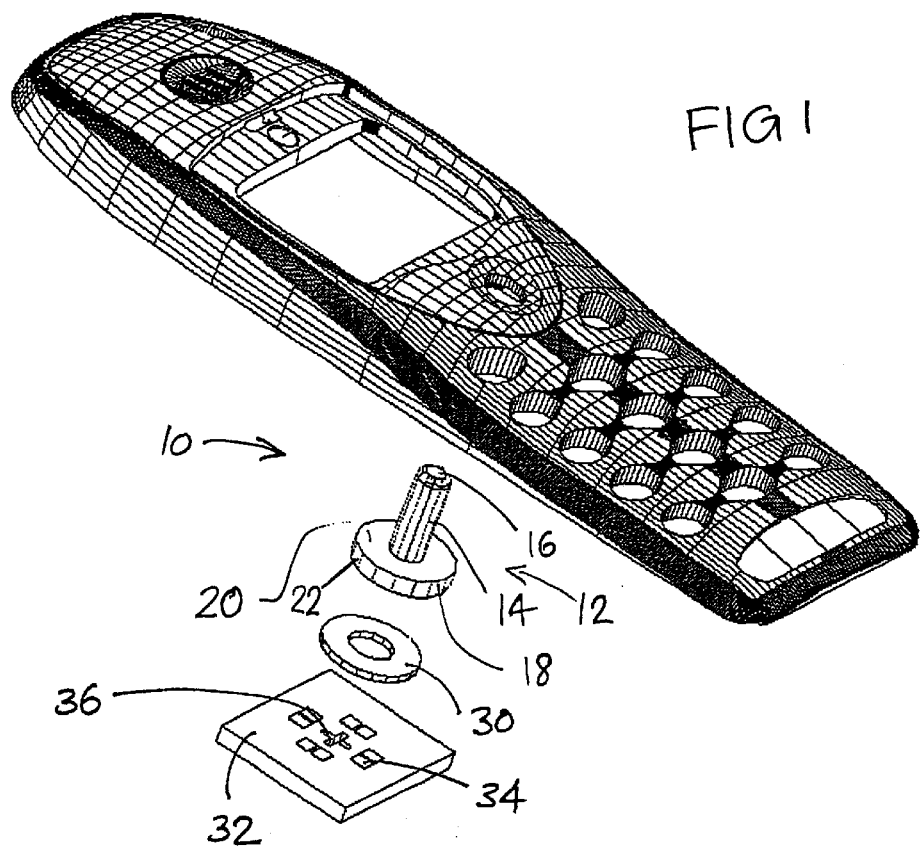
FIG. 1 is a schematic exploded isometric view from above a joystick controller in accordance with a preferred embodiment of the present invention.

Referring initially to FIG. 1, the main components making up a joystick controller in a preferred embodiment of the present invention are shown schematically in a disassembled condition in perspective view in relation to a mobile phone upper housing cover. The controller comprises a joystick, a layer of ER material in line with and below the joystick, and a PCB board carrying electrical contact pads disposed below the ER material.

The joystick 10 comprises a control lever 12 which consists of a short stem 14 which is free at its upper end 16. The stem 14 is approximately 5 mm in length, and is designed so as to be actuable by a user's thumb.

At the other end of the stem 14—ie. the end remote from the free end 16—the stem 14 is attached to, and upstands centrally from, a base member 18. The base member 18 is generally disc-shaped presenting a flat, circular upper surface 20 which has a diameter greater than that of stem 14 of approximately 8 mm and is coaxial therewith. When the joystick controller 10 is assembled in a mobile phone the circular upper surface 20 of the base member 18 can be flush with the outer surface of the front housing of the mobile phone, with the stem 14 extending outwardly therefrom, or the upper surface 20 can be below the surface of the front housing, with the stem 14 protruding through a hole in the front housing.

The side wall 22 of the base member 18 extends straight down from the outside edge of the circular upper surface 20, with a depth of 6 mm. It may alternatively, follow an inward curve to define a truncated dome-like structure. This would allow the sidewall 22 to co-operate with, and bear against, a cupped wall of the housing in which it sits, and thereby pivot with respect to the cupped wall.

Figure 2:
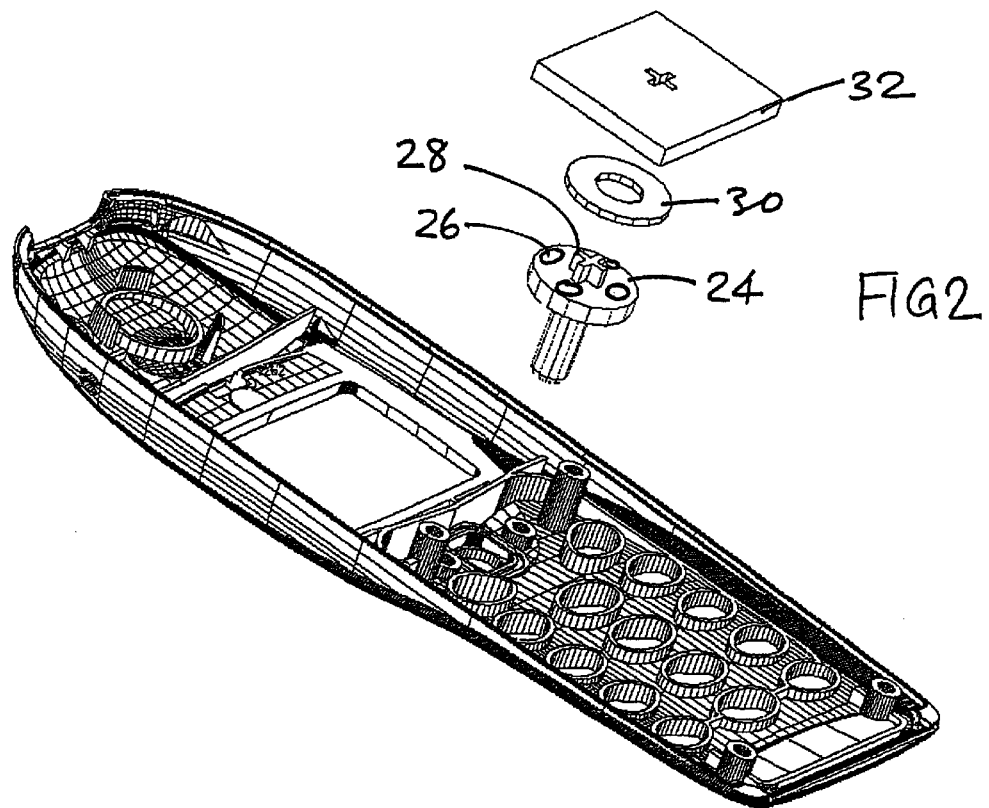
FIG. 2 is a schematic exploded isometric view from below the joystick controller of FIG. 1.

The undersurface 24 of the base member 18 is illustrated in FIG. 2. Depending from the lower surface 24 of the base member 18 are four activating studs 26 regularly spaced in a circle at 90° from one another around a pivot cruciform 28, the depth of each stud being 1 mm. The location of the activating studs 26 on the lower surface 24 is such that once assembled with the rest of the joystick components, they are in alignment with electrical contact pads provided on a PCB below it (described in greater detail below). The central pivot cruciform 28 extends down 2 mm so that it extends below the depth of the activating studs 26, and hence presents a pivot point for the joystick. Whilst providing a pivot point, the cruciform configuration ensures that the joystick lever does not rotate out of position.

The joystick lever, the base, the activating studs and the pivot bump are all integrally moulded from plastics material, and in total the joystick is 7 mm axially in length.

Shown in FIG. 1 disposed below the joystick 10 is a layer of ER material 30. The ER material 30 is in the form of a thin annular ring of approximately 8 mm outer diameter and 5 mm inner diameter, and up to 1 mm thick. It is generally found that the thinner the layer is, the more sensitive it is. The ER material 30 is positioned so that the ring of material covers the activator studs 26 of the joystick. In the preferred embodiment, the ER ring is screen printed onto the activator studs of the joystick. In this process ER material paste is applied to the lower surface of the joy'stick by wiping it across over a stencil. The stencil is a 0.12 mm thick sheet of stainless steel which has the required annular pattern of the ER ring laser cut into it. The ER paste is wiped across the surface of the stencil and through the laser etched annular ring pattern on the activator studs. It is then cured. As an alternative to screen printing, the ER material layer could be moulded onto the activator studs using a two-shot moulding process. The layer could, in a further alternative, be provided as an individual part in the form of a thin layer of annular material.

The basic operating principle of the ER material is that its resistance reduces as a mechanical force is applied, changing from being an insulator to a conductor when mechanically loaded. The applied loading may be compression, tension, torsion or shear forces. The chemical composition and structure of an ER material basically comprises an elastically deformable polymer that includes an electrically conductive filler spread out within and encapsulated by, the non-conductive elastomer structure, and a modifier which promotes the elasticity of the material. Accordingly, the ER material exhibits a change in its bulk conductivity from that of the elastomer to that of the entrapped conductive filler particles. Further details of a suitable ER material are given in patent publication PCT/GB98/00206. The properties of the elasto-resistive material described in this PCT publication are as follows: in an unstressed state the elasto-resistive material is an insulator with resistance of between $10^{12}$ to $10^{14}$ ohms per centimeters. Upon loading the resistance decreases to between 1 to 100 micro ohms per centimeter. It has been found that resistance is inversely proportional to the load applied. Furthermore, by varying the chemical composition of the material, the force needed to change state can be adjusted from being a heavy point load at the high end, down to audio sensitivity at the lower end, e.g. speech activation.

Figure 3:
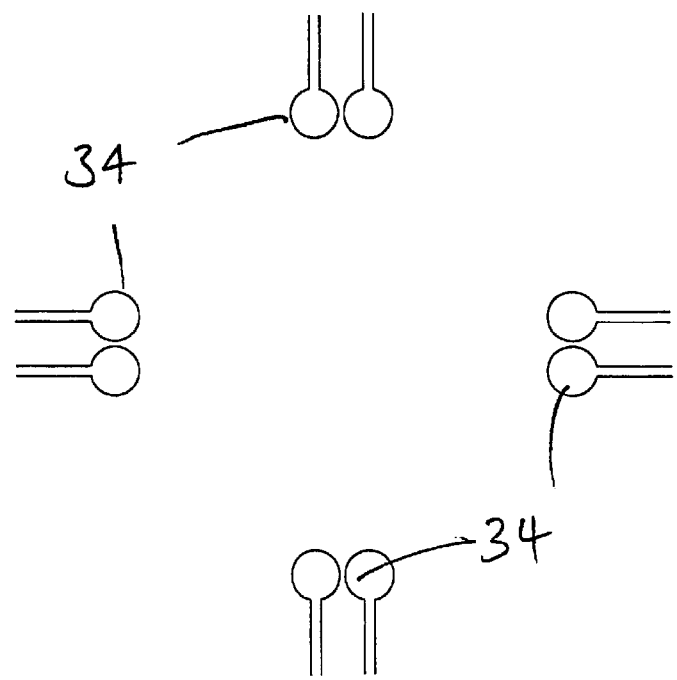
FIG. 3 is a schematic layout of electrical contact pads in accordance with the embodiment shown in FIGS. 1 and 2.

The final main component of the joystick controller is the PCB 32 which carries on its upper surface the electrical contact pads 34. FIG. 3 shows the array of contact pads used in conjunction with the four way joystick described above. As shown, there are four pairs of contact pads 34 at regularly spaced intervals on the PCB and these are positioned to be in registration with the activator studs 26 on the joystick. Each pair of contact pads 34 is normally open, being electrically separated by a gap of up to 1mm but this dimension can vary depending on the thickness of ER material used. The centre of the PCB 32 has a fulcrum recess 36 for receiving the pivot cruciform 28 of the joystick, the recess being shaped to receive the pivot cruciform 28 and support the joystick 10, thereby allowing pivotal movement of the joystick 10.

When the components of the joystick controller are assembled, the ER material 30 comes into contact with, and rests on, the contact pads 34 of the PCB 32. The pivot cruciform 28 of the joystick 10 is located in a fulcrum recess 36 provided in the PCB 34.

When not in use the joystick lever 12 is orthogonal to the ER material 30 and applies no resultant force on the ER material which thus remains in an unstressed condition. Consequently, the ER material 30 acts as an insulator across the contact pads 34. Movement of the joystick lever 12 causes the activator studs 26 which depend from the base of the joystick lever to compress the ER material 30 thereby changing its resistance and allowing an electrical signal to flow across the switch contact pads 34. The greater the lever movement the greater the signal. A typical force required to move the joystick is 2 Newtons.

This operation will now be described in more detail.

The normal position assumed by the joystick is herein defined as the first position, this is the equilibrium position in which the joystick is balanced at 90° to the plane of the ER material and the PCB. In this position the ER material is in a relaxed state and there is no net force on the material. Hence the ER material acts as an electrical insulator, and consequently there is no current output from any of the pairs of contact pads which remain in open circuit. As a result, the on-screen cursor or image remains static in its particular present position.

When a user wishes to move the viewed image or cursor around the display screen he pushes or pulls on the joystick lever by placing his thumb on the free end of the control lever and manipulating it up (North) or down (South) or from side to side (West/East). The effect of moving the joystick around in this manner is that it pivots in the fulcrum recess provided in the PCB about the pivot cruciform, and this pivoting movement maybe around any axis in the plane perpendicular to the first joystick position. In the instance where a user wishes to move the on-screen image/cursor directly upwards then he would urge the joystick directly up (North). This pivots the joystick and consequently the activator studs at the major axes of the base of the joystick are also pivoted. The top (North) activator stud consequently compresses the area of the ER material which is disposed below the North activator stud. This causes a local change of state in the ER material from an insulator to a conductor and this then electrically closes the gap between the corresponding pads on the PCB. The other areas of the ER material experience negligible stress and therefore do not change state to an extent sufficient to alter its resistance. Therefore the other pairs of contact pads remain open circuit. The on-screen effect of this due North movement of the joystick results in a corresponding due North movement of the on-screen cursor. The user will hold the joystick in this position for the time necessary for the cursor to move to the required on-screen location.

Once the cursor arrives at the required on-screen location the user releases the joystick. On release, the joystick returns to the first position described above wherein there is no net force on the ER material and therefore all contacts pads are on open circuit, and consequently there is no further movement of the on-screen cursor. The joystick is returned to the first position by virtue of resilient means provided in the ER material which is a combination of the elastomer and the modifier. These act against the force applied to the joystick to return the joystick to the first position.

Movement of the on-screen cursor will also be required in positions between the major axes and thus the joystick is multi-directional. If the user wishes to move the on-screen cursor in say a diagonal direction between say North and East the user would tilt the joystick lever in a North East direction. Since activator studs are provided at only North and East locations, both of these are pushed down on by equal amounts and therefore the associated ER material is also urged in equal amounts. Because the resistance of the ER material is inversely proportional to the load applied there is a change in resistance of the ER material which correlates to the amount of compression force applied which in this case is substantially half of that applied in the case of a due North only movement, therefore the resistance changes less and consequently the current which is allowed to flow between the contact pads is correspondingly less. This occurs at both the North and the East directions and the resultant component of these currents is used to move the on-screen cursor in the required diagonal direction. In such a way, the user by coordinating precise manipulation of the joystick can control the on-screen cursor. In the joystick movements and positions, software is used to handle and interpret the analogue signals output by the contact pads so as to send the signals out for controlling the movement of the on-screen cursor in the desired manner.

Figure 4A:
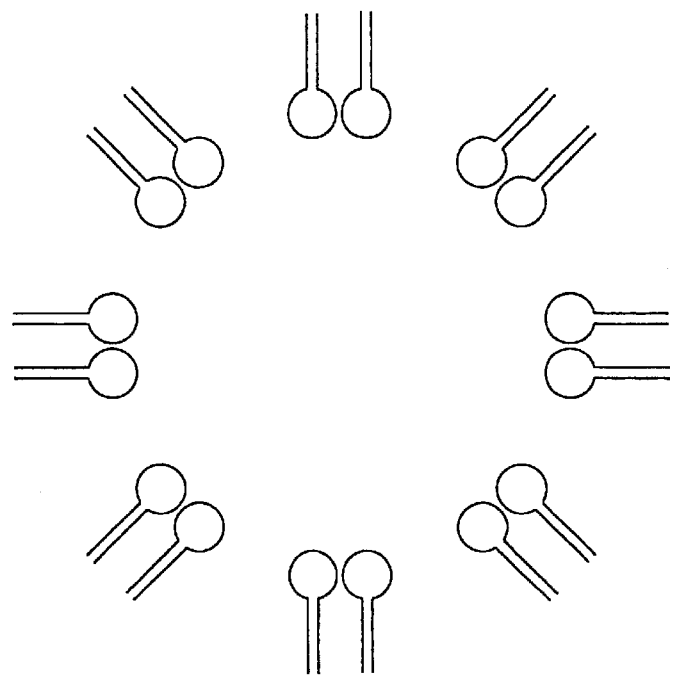
FIGS. 4a and 4b show alternative layouts of contact pads, in accordance with further embodiments of the present invention.
Figure 4B:
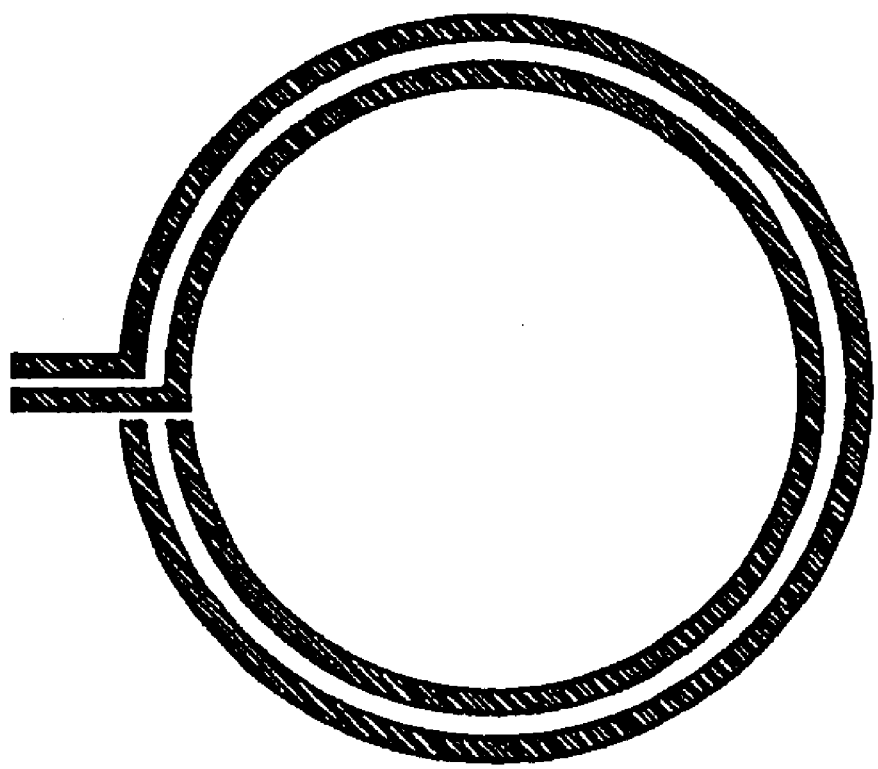

The present invention may be embodied in other specific forms without departing from its essential attributes. For example, rather than having four actuating studs the joystick could be provided with eight equally spaced activating studs. The contact pad array would then consist of eight equally spaced pairs of contact pads as shown in FIG. 4a. In a further alternative configuration the contact pad array could in the form of a continuous track as shown in FIG. 4b. The actuator studs would need to be modified to be consistent with the alternative contact pads configurations.

Furthermore, it is envisaged that the joystick need not be pivotally mounted but could with the necessary mechanical modifications for example be linearly mounted for sliding or roller movement. Also, the housing may be either the housing defined by the portable radio communication device itself, or it may be that of a joystick controller module, which would be advantageous since the controller would then be a self contained unit ready for direct assembly into the portable radio communication device. Also, it may be that rather than taking the form of a joystick, the control member could take the form of a rocker, which is substantially planar. Accordingly reference should be made to the appended claims and other general statement's herein rather than to the foregoing specific description as indicating the scope of invention.

Additionally, each feature disclosed in this specification (which term includes the claims) and/or shown in the drawings may be incorporated in the invention independently of other disclosed and/or illustrated features. In this regard, the invention includes any novel features or combination of features disclosed herein either explicitly or any generalisation thereof irrespective of whether or not it relates to the claimed invention or mitigates any or all of the problems addressed.

The appended abstract as filed herewith is included in the specification by reference.

What is claimed is:

1. A joystick controller for a portable radio communication device having a control member and an elasto-resistive material layer disposed in abutting relationship with the control member, the elasto-resistive material being an electrical insulator when in a relaxed state and an electrical conductor when in a stressed state, the control member being mounted for movement with respect to the elasto-resistive material layer between non-operative and operative positions, wherein the non-operative position is such that a user does not actuate the control member, the control member accordingly does not stress the elasto-resistive material layer, the elasto-resistive material layer accordingly is in a relaxed state and thereby acts as an electrical insulator, and the operative position is such that a user actuates the control member, the control member accordingly stresses the elasto-resistive material layer, the elasto-resistive material layer accordingly is in a stressed state and thereby acts as an electrical conductor, the amount of current conducted by the elasto-resistive material layer being proportionally responsive to the degree of stress applied on the elasto-resistive material layer by the control member, whereby said amount is indicative of the configuration of the control member in relation to the elasto-resistive material layer, and wherein the elasto-resistive material layer is arranged to bias the control member to return the non-operative position when it is released from the operative position.

2. A joystick controller according to claim 1, wherein the elasto-resistive material is a polymer composition comprising electrically conducting particles encapsulated within an electrically insulating elastomer, the ratio of the conducting particles to the non-conducting elastomer being such that the electrical resistivity of the material varies in a linear manner in response to the application of force to the material.

3. A joystick controller for a portable radio communication device wherein the controller or the device provides a housing, and wherein the controller comprises a control member adapted for actuation by a user and mounted in relation to the housing for pivotal movement therebetween, electrical contact points provided on a printed circuit board and supported in the housing spaced from the control member and outputting an electrical signal when conductively bridged, and an elasto-resistive material layer, the material of which in a relaxed state is an electrical insulator and in a stressed state is an electrical conductor, disposed between, and in contact with, the control member and the electrical contact points; the arrangement being such that when there is no force applied by the user on the control member it is in an equilibrium position and accordingly does not apply stress on the elasto-resistive material layer and accordingly the electrical contact points are in an open circuit, and when a force is applied by the user to the control member it is in a non-equilibrium position accordingly applies a stress on the elasto-resistive material layer and accordingly the electrical points are in a closed circuit, wherein the non-equilibrium position the elasto-resistive material layer conducts current proportionally in response to the degree of stress applied on the elasto-resistive material layer by the control member, whereby the amount of current conducted is indicative of the position of the control member in relation to the elasto-resistive material layer, and wherein the elasto-resistive material layer is arranged to bias the control member to return the nonoperative position when it is released from the operative position.

4. A joystick controller according to claim 3, wherein activator elements depend from the control member and abut the elasto-resistive material so as to compress it when a force is applied by the user to the control member.

5. A joystick controller according to claim 3, wherein the elasto-resistive material is provided in the form of an annular ring and when a force is applied by the user to the control member the control member applies a stress on the elasto-resistive material such that there is a local change of resistance in the annular ring in the region thereof under stress from the control member, so as to close the electrical contact pads associated with that region of the annular ring under stress.

6. A portable radio communication device having a joystick controller comprising a control member and an elasto-resistive material layer disposed in abutting relationship with the control member, the elasto-resistive material being an electrical insulator when in a relaxed state, and an electrical conductor when in a stressed state, the control member being mounted for movement with respect to the elasto-resistive material layer between non-operative and operative positions, wherein the non-operative position is such that a user does not actuate the control member, the control member accordingly does not stress the elasto-resistive material layer, the elasto-resistive material layer accordingly is in a relaxed state and thereby acts as an electrical insulator, and the operative position is such that a user actuates the control member, the control member accordingly stresses the elasto-resistive material layer, the elasto-resistive material layer accordingly is in a stressed state and thereby acts as an electrical conductor, the amount of current conducted by the elasto-resistive material layer being proportionally responsive to the degree of stress applied on the elasto-resistive material layer by the control member, whereby said amount is indicative of the configuration of the control member in relation to the elasto-resistive material layer, and wherein the elasto-resistive material layer is arranged to bias the control member to return the non-operative position when it is released from the operative position.

* * * * *